May 15, 1945.  R. B. CAMPBELL  2,375,750
HYDRAULIC BRAKE SYSTEM FOR MOTOR VEHICLES
Filed Jan. 19, 1942
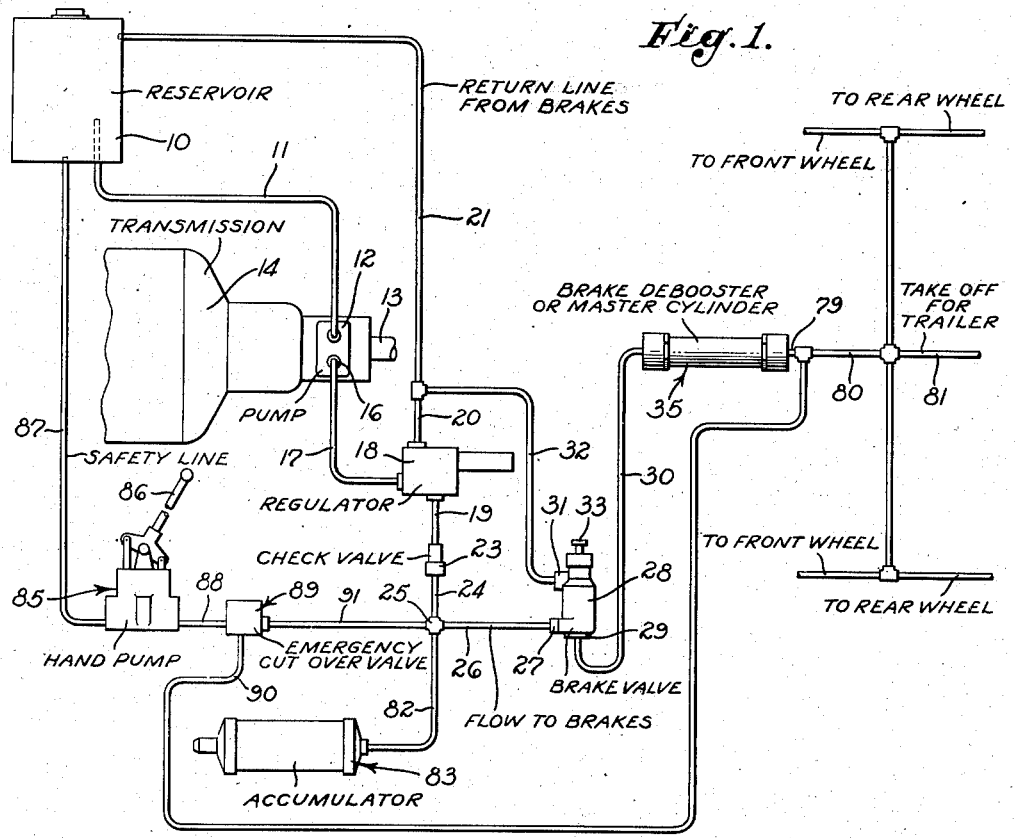
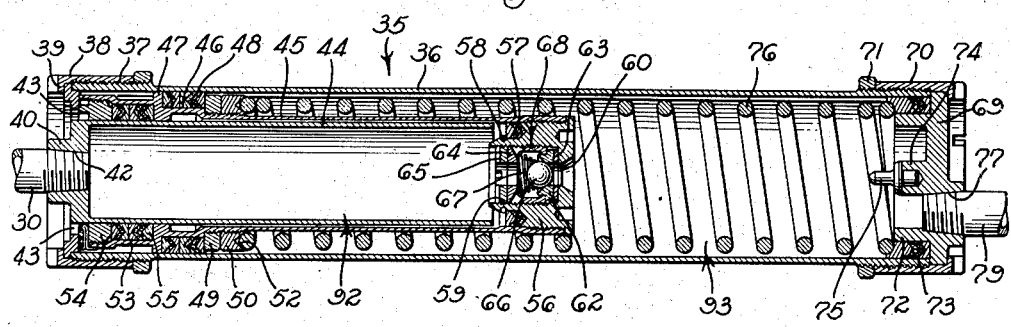
INVENTOR
RODNEY B. CAMPBELL
BY
HARRIS, KIECH, FOSTER & HARRIS
ATTORNEYS.

Patented May 15, 1945

2,375,750

UNITED STATES PATENT OFFICE 2,375,750

HYDRAULIC BRAKE SYSTEM FOR MOTOR VEHICLES

Rodney B. Campbell, North Hollywood, Calif., assignor to John Eley, Jr., Los Angeles, Calif.

Application January 19, 1942, Serial No. 427,252

3 Claims. (Cl. 60—54.6)

This invention relates to the fluid brake art, and more particularly to a fluid brake system particularly adaptable for use on motor vehicles.

In standard hydraulic brake systems for motor vehicles, it is usual practice to provide a supply of substantially non-compressible brake fluid, such as a suitable liquid, and means for applying pressure to the brake fluid so as to feed it to the vehicle brakes. Normally, in such a system, the pressure is applied to the brake fluid by means of a hydraulic cylinder having a piston therein which may be actuated by mechanical or manual means, and ordinarily the pressure applied to the brake fluid is a function of the pressure mechanically applied to the piston of the hydraulic cylinder. When such a fluid brake system is used on a heavy motor vehicle, such as a large truck, considerable difficulty is experienced in mechanically applying sufficient force to the piston of the hydraulic cylinder to provide the relatively high fluid pressure required in the supply lines to operate adequately the brakes of the vehicle. This difficulty exists despite many expedients which are used to multiply mechanically the manual force applied to the brake pedals of the vehicle, as there is a limit to the effective use of such force-multiplying devices. Consequently, many heavy motor vehicles are now equipped with air brakes of the standard railway type, in order to provide the large braking pressures required to stop such vehicles. There are, however, many disadvantages attendant the use of such standard air brakes on motor vehicles, not the least of which is the relatively high cost of installation of such a brake system.

It is therefore a primary object of my invention to provide a hydraulic brake system for vehicles in which a substantially non-compressible brake fluid, or liquid, is used for applying the braking force to the brakes of the vehicle, and in which high brake fluid pressures may be instantaneously provided for actuating the vehicle's brakes without the necessity of applying large manual forces to the brake pedal of the vehicle. I accomplish this by providing a high pressure fluid pump which operates at all times, preferably in response to operation of the vehicle engine, to circulate a flow of brake fluid at a predetermined high operating pressure through a closed system, which pressure fluid may be conveyed instantaneously through a suitable brake fluid valve to the master brake cylinder to apply a predetermined high pressure to the brake fluid communicating with the vehicle brakes.

Another object of my invention is to provide in such a hydraulic brake system pressure accumulator means for storing fluid pressure energy delivered by the high pressure pump so that brake fluid under pressure is available in the system for actuating the brakes at all times, even when the pressure pump is not operating. This is provided to replace the standard "emergency" brake on such a vehicle, so that the brakes may be set to hold the vehicle against movement when the vehicle engine and the pressure pump are not operating.

Still another object of the invention is to provide a novel type of master brake cylinder adapted for use in such a hydraulic brake system. My master brake cylinder includes means for automatically and instantaneously relieving the fluid pressure on the vehicle brakes when the brake valve is closed, so that fluid pressure is applied to the brakes only when the brake valve is open. It also includes a novel type of compensating valve which operates automatically to replace any brake fluid loss from the operating system through leakage or otherwise, and includes other novel details of construction described in full hereinafter.

A further object of my invention is to provide such a hydraulic brake system including safety means whereby pressure may be applied to the brake fluid independently of the operation of the high pressure pump and the other elements of the system, so that in the event of failure of the high pressure pump, the brake valve, the master cylinder, or any of the other units of the system, the vehicle brakes may still be operated. I prefer to accomplish this by providing a hand pump in an auxiliary brake fluid supply line communicating between the source of brake fluid and the vehicle brakes.

Other objects and advantages of the invention will appear in the specification and in the drawing, which are for the purpose of illustration only, and in which:

Fig. 1 is a diagrammatic view of my novel hydraulic brake system.

Fig. 2 is a longitudinal sectional view of the master brake cylinder of my system.

Referring to the drawing, Fig. 1 shows an operating fluid reservoir 10 adapted to be provided with a suitable supply of a substantially non-compressible operating fluid, such as a liquid, and connected by piping 11 with the intake of a pressure pump 12. The pressure pump 12 may be of any suitable type well known in the art adapted to deliver operating fluid from the reservoir 10 under relatively high pressure. For example, I prefer to utilize a pressure pump 12 which will deliver such operating fluid at a pressure in the neighborhood of 1000 pounds per square inch although, obviously, either a lower or higher delivery pressure may be used without departing from the spirit of my invention.

The pressure pump 12 is arranged to be driven by a drive shaft 13 of the motor vehicle in which the hydraulic system is installed, and, as indicated in Fig. 1, I prefer to install the pump 12 adjacent the vehicle transmission 14. Although I prefer to drive the pressure pump 12 directly from the drive shaft 13 of the motor vehicle, it will be understood that any suitable source of power for actuating the pump may be used within the scope of my invention.

The pressure pump 12 has a discharge port 16 which is connected by means of a pipe 17 with the inlet of a fluid pressure regulator 18 comprising a pressure regulating means of the invention. The pressure regulator 18 may be of any suitable type well known in the art which is adapted to deliver operating fluid therethrough supplied by the pressure pump 12 at a predetermined pressure into a pipe 19. Although the specific construction of the pressure regulator 18 forms no part of the present invention, I prefer to use such a device as is illustrated in my copending application, Serial No. 258,975, filed February 28, 1939, and issued as Pat. No. 2,310,677, to which reference is hereby made. The pressure regulator 18 is also provided with an exhaust pipe 20 which connects with a fluid return pipe 21, one end of which is connected to the reservoir 10. The pipe 19 is connected to the inlet of a check valve 23, the outlet of which is connected by a pipe connection 24 with a four-way pipe joint 25. The check valve 23 may be of any suitable type adapted to permit a flow of operating fluid therethrough from the pipe 19 to the pipe connection 24, but preventing a reverse flow thereof, such as shown in my copending application, Serial No. 397,573, filed June 11, 1941, and issued as Pat. No. 2,306,012, to which reference is hereby made.

One side of the pipe joint 25 is connected through a pipe 26 with the valve inlet 27 of a brake valve 28. The brake valve 28 is provided with a valve outlet 29 to which is suitably connected a supply pipe 30, and the brake valve is also provided with an exhaust port 31 which is connected by means of an exhaust pipe 32 with the fluid return pipe 21. The brake valve 28 is also provided with an actuating member 33 which is so designed that when depressed it will open the brake valve to permit a flow of operating fluid from the pipe 26 through the brake valve into the supply pipe 30 and when released will prevent such flow, opening the supply pipe 30 to communication through the brake valve with the exhaust pipe 32. Although any suitable type of brake valve 28, well known in the art, may be used, I prefer to utilize a brake valve of the type shown and described in my copending application, Serial No. 397,572, filed June 11, 1941, and issued as Pat. No. 2,317,846, to which reference is hereby made for the details of construction thereof which form no part of the present invention.

The supply line 30 leads to and is connected to a master hydraulic cylinder 35, the details of which are shown in Fig. 2. As shown in Fig. 2, the master hydraulic cylinder 35 includes a tubular outer shell 36 provided with external threads 37 at one end thereof on which is threaded an annular clamping sleeve 38 provided with a flange 39 which rigidly clamps a first head 40 relative to the tubular outer shell 36. The head 40 is centrally provided with a threaded inlet port 42 into which is threaded the end of the supply pipe 30. The head 40 is also provided with a plurality of circumferentially spaced ports 43, for a purpose to be described hereinafter, and formed integrally with the head is an inwardly extending cylindrical sleeve 44, although, obviously, this sleeve may be made as a separate element and suitably secured to the head 40 if desired. Supported on the cylindrical sleeve 44 is an axially movable piston sleeve 45 having an annular shoulder 46 formed thereon and provided with an annular flange 47 against which abuts an annular packing 48, preferably of the chevron type, which is held in position by a suitable nut 49 threaded on the piston sleeve 45 and locked against movement by a lock nut 50 having an annular V-groove 52 formed in the end face thereof. Mounted on the annular flange 47 is a tubular extension 53, which is of greater diameter than the diameter of the piston sleeve 45, the outer end of which is internally threaded to receive a packing follower ring 54 which serves to clamp an annular packing 55, also preferably on the chevron type, against the flange 47. As will be evident, the annular packing 48 forms a fluid seal between the piston sleeve 45 and the internal wall of the tubular outer shell 36, and the annular packing 55 forms a fluid seal between the piston sleeve 45 and the external wall of the cylindrical sleeve 44. The piston sleeve 45, together with the other parts mounted thereon, forms a fluid piston means of the invention.

The rightward end of the piston sleeve 45, as seen in Fig. 2, is internally threaded to receive a sleeve head 56, the inner face of which is provided with an annular packing 57, preferably of the chevron type, which is held in place by a suitable snap ring 58 and serves to form a fluid-tight joint between the sleeve head 56 and the piston sleeve 45. The sleeve head 56 is also provided with an internally threaded central chamber 59 which communicates through an axial opening 60 with the right-hand end of the interior of the outer shell 36. Mounted in the central chamber 59 is an annular valve seat member 62 which engages a washer 63 and is clamped in place by a follower element 64 which is threaded into the central chamber. The follower element 64 is locked in place by an externally threaded annular lock nut 65 which is also threaded into the central chamber 59. Supported on the annular valve seat member 62, and normally closing the same, is a ball valve member 66 which is at all times resiliently urged toward seating relation with the valve seat member by a helical compression spring 67. The sleeve head 56 and the parts mounted therein constitute a compensating valve means 68 of the invention, and, as is evident, normally close the rightward end of the piston sleeve 45.

The rightward end of the tubular outer shell 36 is closed by a second head 69 which is clamped against the rightward end of the outer shell by a second annular clamping sleeve 70 which is suitably threaded to the outer shell and locked relative thereto by a suitable lock nut 71. An annular, inwardly extending ring 72 is formed on the inner face of the second head 69, and disposed between this ring and the outer shell 36 is an annular packing element 73, preferably of the chevron type, which insures an effective seal between the second head 69 and the outer shell 36. Formed at the center of the second head 69 is an inwardly extending boss 74 in which is secured an inwardly extending pin member 75 which, it will be observed, is axially aligned with the annular valve seat member 62 and which serves as an actuating means to unseat the ball valve member 66 as described hereinafter. Engaging the annular packing element 73 is a main compression spring 76, the other end of which engages in the V-groove 52 of the nut 49 carried on the piston sleeve 45, and which is under a predetermined compression tending to normally move the piston sleeve 45 toward the inlet port 42 and away from the second head 69. Also formed in the second head 69 is a threaded outlet port 77 adapted to receive a pipe connection 79 of a fluid distribution system 80 which leads to the vehicle brakes (not shown) as is well known in the art. A separate fluid line 81 may also be provided if desired as a fluid take-off leading to a trailer or other device to be operated by the fluid in the distribution system, if desired.

Connected to the pipe 26 through the four-way pipe joint 25 and an accumulator pipe 82 is a fluid pressure accumulator device 83, which may be of any type well known in the art, and which is adapted to store fluid under pressure and automatically deliver the same through the accumulator pipe 82 to the pipe 26 upon a predetermined reduction in fluid pressure in the pipe 26.

I also prefer to incorporate with my hydraulic brake system an auxiliary pumping means whereby operating fluid may be pumped from the reservoir 10 to the fluid distribution system 80 independently of the pressure pump 12 and the equipment connected thereto, so that in the event of failure of any of the principal equipment, as in an emergency, the brakes of the vehicle may still be actuated by an independent source of operating fluid. To accomplish this, I provide a hand pump 85 of any suitable type well known in the art and which is provided with a manual operating lever 86. The intake of the hand pump 85 is connected to the reservoir 10 by an intake pipe 87, and the discharge from the hand pump is conveyed through a discharge pipe 88 and an emergency cut-over valve 89 to an auxiliary pressure supply pipe 90 which communicates directly with the fluid distribution system 80. The emergency cut-over valve 89 is also connected by a pipe 91 to the four-way pipe joint 25 so that operating fluid under pressure may be supplied therethrough to the emergency cut-over valve from the pump 12 while the pump is operating. The emergency cut-over valve 89 may be of any type well known in the art which is so constructed and arranged that so long as fluid at a predetermined pressure is maintained in the pipe 91 the cut-over valve is closed to prevent operation of the hand pump 85, but which will automatically permit communication between the discharge pipe 88 and the auxiliary pressure supply pipe 90 through the cut-over valve whenever the fluid pressure in the pipe 91 drops below a predetermined minimum. I prefer to use an emergency cut-over valve of the type shown and described in my copending application, Serial No. 412,117, filed September 24, 1941, and issued as Pat. No. 2,312,686, although any suitable type of such device may be used as desired. Furthermore, if desired, the emergency cut-over valve 89 and the pipe 91 may be omitted from the system and the pipe connection 88 connected directly to the auxiliary pressure supply pipe 90 so that at any time the hand pump 85 may be actuated to independently supply operating fluid from the reservoir 10 to the distribution system 80. However, it will generally be found desirable to incorporate some form of emergency cut-over valve, such as the cut-over valve 89, to prevent actuation of the hand pump 85 except when such actuation is required by a failure in the parallel supply system.

In operation, as indicated, the fluid distribution system 80 is suitably connected to one or more hydraulic brakes on the motor vehicle, as desired and as well known in the art, and is preferably separately filled with operating fluid. Upon operation of the engine of the vehicle, the drive shaft 13 rotates to operate the pressure pump 12, which draws operating fluid from the reservoir 10 through the piping 11 and discharges it at relatively high pressure, preferably in the neighborhood of 1000 pounds per square inch or more, into the pipe 17 through which it is conveyed into the fluid pressure regulater 18. The fluid pressure regulator 18 is adapted to discharge operating fluid from the pipe 17 into the pipe 19 to maintain operating fluid in the pipe 19 at a predetermined pressure, which may be at or below the pressure of the operating fluid in the pipe 17. The balance of the operating fluid conveyed through the pipe 17 is exhausted through the pressure regulator 18 into the exhaust pipe 20 and is conveyed through the fluid return pipe 21 back to the reservoir 10. It will thus be observed that during operation of the pressure pump 12, fluid circulates from the reservoir 10 therethrough and through the pressure regulator 18 and back to the reservoir, providing a constant circulation of fluid in this cycle so long as the pressure pump 12 is operating.

Operating fluid is conveyed from the pressure regulator 18 through the pipe 19 and the check valve 23 and the pipe connection 24 to the four-way pipe joint 25. It flows from the pipe joint 25 through the pipe 91 to the emergency cut-over valve 89, to close the same to prevent actuation of the hand pump 85. It also flows through the accumulator pipe 82 to the fluid pressure accumulator device 83 to build up the desired line pressure therein and store the same. It also flows through the pipe 26 to the valve inlet 27 of the brake valve 28. So long as the actuating member 33 of the brake valve 28 is not depressed, the brake valve remains closed to prevent a flow of operating fluid from the pipe 26 into the supply pipe 30 through the brake valve. However, when the actuating member 33 is depressed, the brake valve 28 is opened to permit a flow of operating fluid therethrough from the pipe 26 into the supply pipe 30 through which it flows to the inlet port 42 of the master hydraulic cylinder 35.

Operating fluid flows into the master hydraulic cylinder 35 through the inlet port 42 and to the interior of the cylindrical sleeve 44 to exert the relatively high supply line pressure on the sleeve head 56 of the piston sleeve 45, which tends to move the piston sleeve away from the first head 40 and toward the second head 69 against the action of the main compression spring 76. The main compression spring 76 is designed so that the force exerted by it on the piston sleeve 45 tending to move the piston sleeve to the left, as seen in Fig. 2, is substantially less than the force exerted on the piston head 56 by the fluid pressure within the cylindrical sleeve 44. Consequently, the piston sleeve 45 moves to the right toward the second head 69.

Movement of the piston sleeve 45 to the right, as seen in Fig. 2, displaces operating fluid from the right-hand end of the outer shell 36 through the outlet port 77 into the distribution system 80 to operate the wheel brakes of the vehicle, as is well known in the art. The actual minimum fluid displacement of the outer shell 36 required is governed by the minimum volume of operating fluid needed to fully actuate the wheel brakes, and in practice I prefer to design my device so that the total possible displacement of operating fluid from the outer shell 36 is slightly greater than the displacement actually required to fully actuate the wheel brakes, for example, two or three cubic inches greater. This provision is made in design in order to provide for minor volumetric losses of operating fluid in the distribution system 80 arising from fluctuations in the temperature of the operating fluid or slight leakage. Major volumetric loss in the operating fluid in the distribution system 80 is corrected by the compensating valve means 68, as described hereinafter.

It is to be noted that the master hydraulic cylinder 35 is in effect divided into a small volume, high pressure chamber 92 formed by the cylindrical sleeve 44, which at all times is in open communication with the inlet port 42, and a large volume, low pressure chamber 93 formed by the rightward end of the outer shell 36, which at all times is in open communication with the outlet port 77. Preferably, the volume of the low pressure chamber 93 is approximately three times that of the high pressure chamber 92, so as to provide a pressure differential of about three to one therebetween. Thus, the maximum fluid pressure developed in the low pressure chamber 93, upon movement of the piston sleeve 45 to the right, is only about one-third of that applied to the high pressure chamber 92, with the highly desirable result that a smooth wheel brake application can be obtained even though a high operating pressure, for example in the neighborhood of 1000 pounds per square inch, is used to actuate the master hydraulic cylinder 35.

Due to the fact that the fluid displacement volume of the low pressure chamber 93 is greater than the normal displacement volume of operating fluid in the distribution system 80 required to apply fully the wheel brakes of the vehicle, as pointed out above, upon admission of operating fluid to the high pressure chamber 92 the piston sleeve 45 normally moves to the right and completes its rightward stroke by stopping short of engagement with the pin member 75, having thus fully applied the vehicle brakes. Upon release of the actuating member 33 of the brake valve 28, the supply line 30 is again automatically connected to the exhaust pipe 32, which is at relatively low reservoir or exhaust pressure, as described above, and the piston sleeve 45 immediately returns to the position shown in Fig. 2, under the action of the fluid pressure in the distribution system 80 and the force exerted by the main compression spring 76.

In the event that the volume of operating fluid in the distribution system 80 is materially reduced, as a result of fluid leakage or otherwise, the compensating valve means 68 automatically operates to replenish the distribution system with operating fluid. In such event, upon rightward movement of the piston sleeve 45, instead of stopping its rightward travel before engagement with the pin member 75 as during normal operation, it continues to move to the right until the pin member 75 engages the ball valve member 66 and unseats it from the annular valve seat member 62, and operating fluid then flows from the high pressure chamber 92 through the valve seat member 62 and into the low pressure chamber 93. Operating fluid continues to flow into the low pressure chamber 93 until its fluid volume increases sufficiently to move the piston sleeve 45 to the left and away from the pin member 75 to permit the ball valve member 66 to reseat on the annular valve seat member 62 under the action of the helical compression spring 67. Due to the pressure-area differential between the high pressure chamber 92 and the low pressure chamber 93, the fluid pressure applied to the wheel brakes through the distribution system 80 while the compensating valve means 68 is open cannot exceed the maximum fluid pressure normally developed in the low pressure chamber 93 during the normal rightward stroke of the piston sleeve 45, thus preventing abnormal and possibly dangerous fluid pressures from being applied to the wheel brake mechanisms. It will thus be appreciated that the compensating valve means 68 operates automatically when required to replenish any undesirable depletion of the volume of operating fluid in the fluid distribution system 80 to maintain at all times sufficient operating fluid in the distribution system to fully actuate the wheel brakes.

It is also to be noted that in the event that the volume of operating fluid in the distribution system 80 tends to expand, due to an increase in temperature thereof or from other causes, the ball valve member 66 of the compensating valve means 68 is unseated by such expansion to permit any excess operating fluid from the distribution system 80 to return to the reservoir 10 through the brake valve 28 and the exhaust pipe 32. This effectively prevents undesired rises in pressure of the operating fluid in the distribution system 80, which would otherwise tend to apply partially the wheel brakes of the vehicle, and thus prevents unnecessary wear on the brake mechanisms.

In the event of failure of the pressure pump 12, the fluid pressure regulator 18, the brake valve 28, the master hydraulic cylinder 35, or any of the pipe connections therebetween, as in an emergency, operating fluid may still be manually pumped from the reservoir 10 to the fluid distribution system 80 by the hand pump 85 to actuate the wheel brakes. This is a desirable safety feature of the invention.

Although I have shown and described a preferred embodiment of my invention, it will be appreciated that certain units, parts, and mechanisms may be substituted for those disclosed herein, without departing from the spirit of my invention, and, consequently, I do not intend to be limited by the specific terms of my disclosure but desire to be afforded the full scope of the following claims.

I claim as my invention:

1. In a master cylinder device, the combination of: a tubular outer shell; a first head closing one end of said outer shell and having an inlet port therein; a second head closing the other end of said outer shell, there being an outlet port communicating with said other end of said shell; a stationary sleeve rigidly mounted in said outer shell relative to said first head, said inlet port communicating with the interior of said sleeve; an axially movable sleeve carried on said stationary sleeve; piston means secured on one end of said movable sleeve adjacent said inlet port and forming a fluid seal with the interior of said outer shell; a separate sleeve head threaded to and closing the other end of said movable sleeve; valve means carried by said sleeve head; actuating means for opening said valve means in response to axial movement of said movable sleeve, said actuating means being mounted on said second head; and spring means in said outer shell surrounding said movable sleeve and engaging said piston so as to normally urge it toward said first head.

2. In a master cylinder device, the combination of: a tubular outer shell; a first head closing one end of said outer shell and having an inlet port therein; a second head closing the other end of said outer shell, there being an outlet port communicating with said other end of said shell; a stationary sleeve rigidly mounted on said first head and concentric with said outer shell, said inlet port communicating with the interior of said stationary sleeve; an axially movable sleeve carried on said stationary sleeve; annular piston means secured to said movable sleeve at its end toward said inlet port and forming a fluid seal with the interior of said outer shell; a sleeve head closing the other end of said movable sleeve; a spring-held check valve carried by said sleeve head and adapted to open toward said inlet port; a pin on said second head extending into said outer shell in alignment with said check valve and adapted to open said check valve in response to a predetermined axial movement of said sleeve head toward said second head; and spring means in said outer shell surrounding said movable sleeve and engaging said piston so as to normally urge it toward said first head.

3. In a master cylinder device, the combination of: a tubular outer shell; a first head closing one end of said outer shell and having an inlet port therein; a second head closing the other end of said outer shell, there being an outlet port communicating with said other end of said shell; a stationary sleeve mounted on said first head and concentric with and projecting a substantial distance into said outer shell, said inlet port communicating with the interior of said stationary sleeve; an axially movable sleeve telescoped over said stationary sleeve, said movable sleeve being of substantially the same length as said stationary sleeve; an annular flange member on the end of said movable sleeve adjacent said inlet port; an outer annular sealing means on said movable sleeve in engagement with said flange and forming a fluid seal between said movable sleeve and said outer shell, said flange and said outer sealing means forming a piston; an inner annular sealing means within said movable sleeve adjacent said outer sealing means and forming a fluid seal between said movable sleeve and said stationary sleeve; a sleeve head closing the end of said movable sleeve adjacent said outlet port; check valve means carried by said sleeve head adapted to open toward said inlet to permit a flow of fluid from said inlet to said outlet but preventing a reverse flow; actuating means carried by said second head and adapted to open said check valve means upon a predetermined travel of said sleeve head toward said second head; and spring means in said outer shell engaging said second head and telescoped over said movable sleeve to engage said piston and extending substantially the length of said outer shell when said movable sleeve is in a retracted position closest to said first head.

RODNEY B. CAMPBELL.